(12) United States Patent
Chen et al.

(10) Patent No.: US 7,822,714 B2
(45) Date of Patent: Oct. 26, 2010

(54) EXTENDING CONFIGURATION MANAGEMENT DATABASES USING GENERIC DATATYPES

(75) Inventors: Jinfang Chen, Austin, TX (US);
Sushma Bharat Patel, Austin, TX (US);
Shaw-Ben Shepherd Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 11/422,757

(22) Filed: Jun. 7, 2006

(65) Prior Publication Data
US 2007/0294307 A1 Dec. 20, 2007

(51) Int. Cl.
*G06F 7/00* (2006.01)
(52) U.S. Cl. ...................................... 707/634
(58) Field of Classification Search .................. 707/102, 707/634
See application file for complete search history.

(56) References Cited

U.S. PATENT DOCUMENTS

2004/0148278 A1* 7/2004 Milo et al. ..................... 707/3
2004/0240670 A1 12/2004 Man et al.
2004/0267721 A1 12/2004 Meyerzon et al.
2005/0050068 A1* 3/2005 Vaschillo et al. ............ 707/100
2005/0172212 A1 8/2005 Birsa et al.

* cited by examiner

*Primary Examiner*—Apu M Mofiz
*Assistant Examiner*—Ajith Jacob
(74) *Attorney, Agent, or Firm*—Yee & Associates, P.C.; Jeffrey S. LaBaw

(57) ABSTRACT

A computer implemented method, data processing system, and computer program product for allowing users with minimal database skills to produce efficient, extended configuration management databases. Input is received from a user to extend a configuration management database, wherein the input includes a generic data type. The generic data type is mapped to a database data type of the configuration management database. An SQL statement is then generated to create the database data type in the configuration management database. Responsive to a successful execution of the SQL statement, the tables in the configuration management database are updated with the database data type to reduce a number of tables created for the database data type.

5 Claims, 4 Drawing Sheets

EXTENDING CONFIGURATION MANAGEMENT DATABASES USING GENERIC DATATYPES

BACKGROUND OF THE INVENTION

1. Field of the Invention

The present invention relates generally to configuration management databases, and more particularly to allowing users with minimal database skills to produce efficient databases when extending configuration management databases.

2. Description of the Related Art

Configuration management is the detailed recording and updating of information regarding an organization's information technology services, such as computer systems and networks, including all hardware and software components. This configuration management information is stored in a configuration management database (CMDB), which internally retains a representation of other software and hardware systems, among other data. Configuration Management Databases have been proposed as part of the Information Technology Infrastructure Library (ITIL) guidelines for managing a network setup, and have been implemented in many areas. ITIL is a set of best practices standards for information technology (IT) service management.

With configuration management, IT components may be tracked and controlled. For example, if a user wants to upgrade a hardware component in the enterprise, the user may, via a configuration management application, submit a query to the CMDB and receive results identifying the components already installed in the system. From this detailed view provided to the user in the CMDB, the user may make an informed decision about the hardware upgrade needed for the system and the effects the change will have on other components and systems in the enterprise.

CMDBs currently provide an extensibility function which allows users to create their own class types and attributes. Although users may extend the functions of existing CMDBs, this process contains several drawbacks. For example, when a user creates a new class type or attribute, the user is required to have extensive knowledge of the database to ensure the table or column intended to store the new class type or attribute can correctly hold the data. If the user does not have extensive database skills, the extension of the CMDB by the user may not produce the most efficient running database with the best query and search performance and use of the minimum amount of table joins. Thus, with current CMDB extensibility, when a non-database savvy user manually creates the necessary tables, there is a learning curve for the user to understand the different database data types available for use in the tables, and a learning curve to understand the performance issues of each database data type. In addition, the non-database savvy user must calculate which arrangement of columns will produce the minimum number of tables for database efficiency.

SUMMARY OF THE INVENTION

The illustrative embodiments provide a computer implemented method, data processing system, and computer program product for allowing users with minimal database skills to produce efficient, extended configuration management databases. Input is received from a user to extend a configuration management database, wherein the input includes a generic data type. The generic data type is mapped to a database data type of the configuration management database. An SQL statement is then generated to create the database data type in the configuration management database. Responsive to a successful execution of the SQL statement, the tables in the configuration management database are updated with the database data type to reduce a number of tables created for the database data type.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
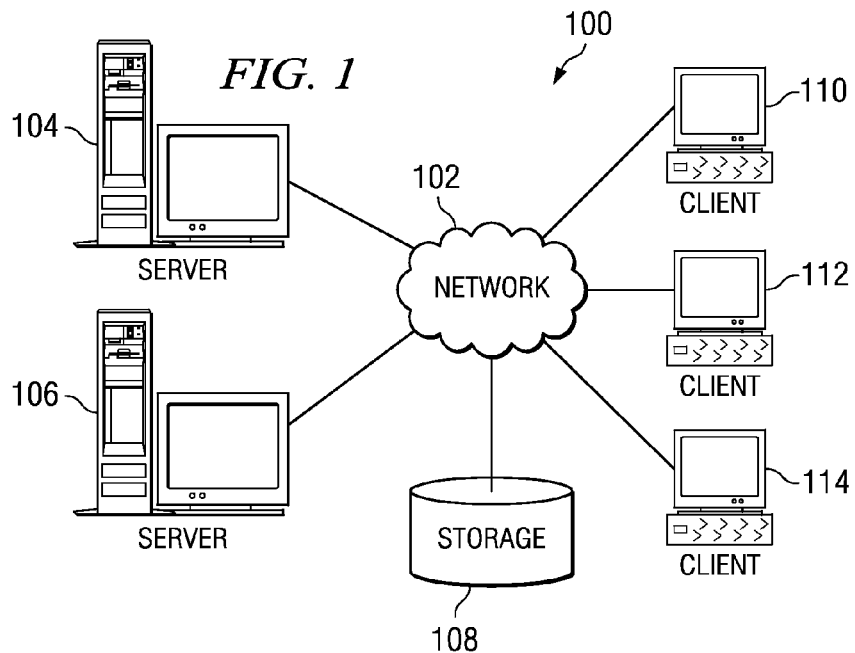
FIG. 1 depicts a pictorial representation of a distributed data processing system in which the illustrative embodiments may be implemented.
Figure 2:
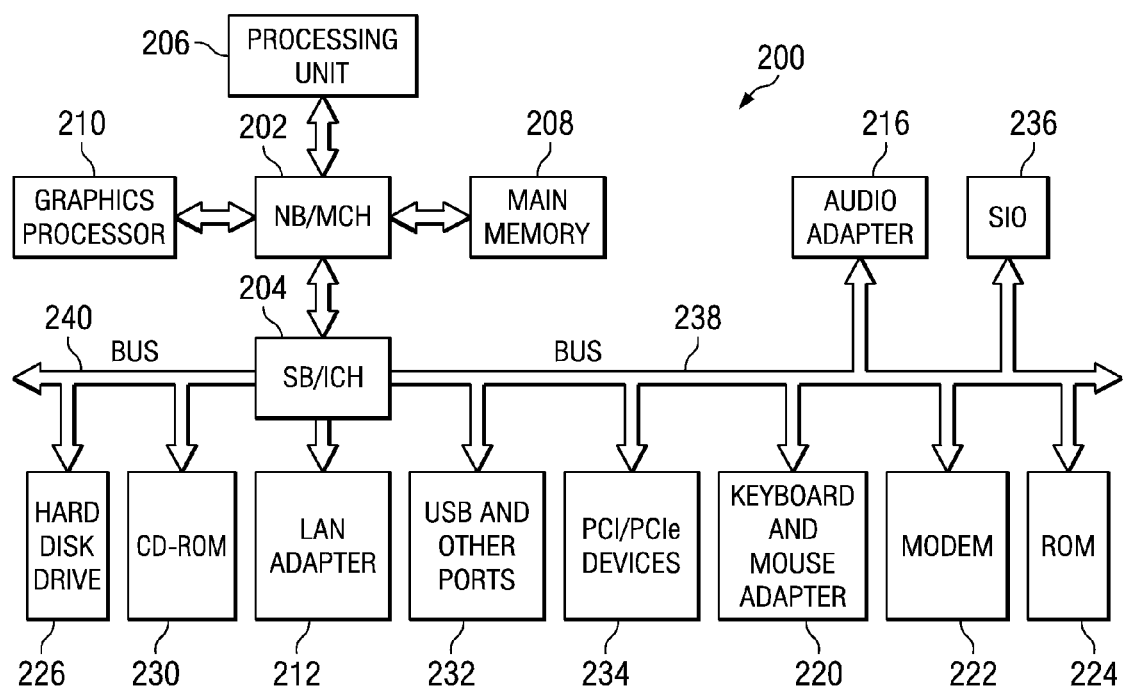
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the illustrative embodiments provide a mechanism for allowing users to extend a configuration management database (CMDB) without requiring that the user have extensive knowledge of the database. When a user wants to add a new attribute or class type to a CMDB, the user may extend the CMDB by providing database updates via a graphical user interface (GUI), by creating a new XML plugin file, or by adding to an existing XML plugin file by providing optional information, such as column or table name, size, and data type. The illustrative embodiments are not limited to a specific GUI embodiment; rather, any GUI that allows for obtaining a generic data type and size input from a user may be used. The database updates provided by the user may comprise generic data type and size information for the new attributes or class types. When the user updates are received at the CMDB, a data type mapping algorithm is used to automatically select an appropriate database data type based on the generic data type provided and the particular CMDB employed. A minimal table creation algorithm is also used to automatically order the columns of the database table in such a way as to reduce the number of tables created for the class type.

The data type mapping algorithm and the minimal table creation algorithm provided by the illustrative embodiments allow developers with minimal database skills to develop efficient databases and provide several advantages of existing extended CMDB techniques which require users to have extensive knowledge of the databases. With the algorithms, it is not necessary for a developer to understand complexities of a database with regards to performance of using different data types or understanding which data type combinations with the size of the data to be inserted is most optimal solution to minimize amount of memory consumption. In addition, a developer is not required to understand different data types and size limitations of each data type or calculate the least number of tables to create for holding the attributes for each class type.

The illustrative embodiments also provide extensible markup language (XML) extension plugins to the core CMDB XML schema plugin. The extension plugins comprise separate internal (company) and external (customer) extension schemas, and these internal and external schemas are separated from the core CMDB schema. In this manner, the interfaces, classes, attributes, and relationships comprising a schema are preserved in separate core CMDB, internal, and external plugins. A common XML file is used to link the separate plugins. The XML file represents a schema of the extensible CMDB and is used to easily update the database by identifying locations in the database in which new columns (attributes) or tables (class types) may be inserted.

Figure 3:
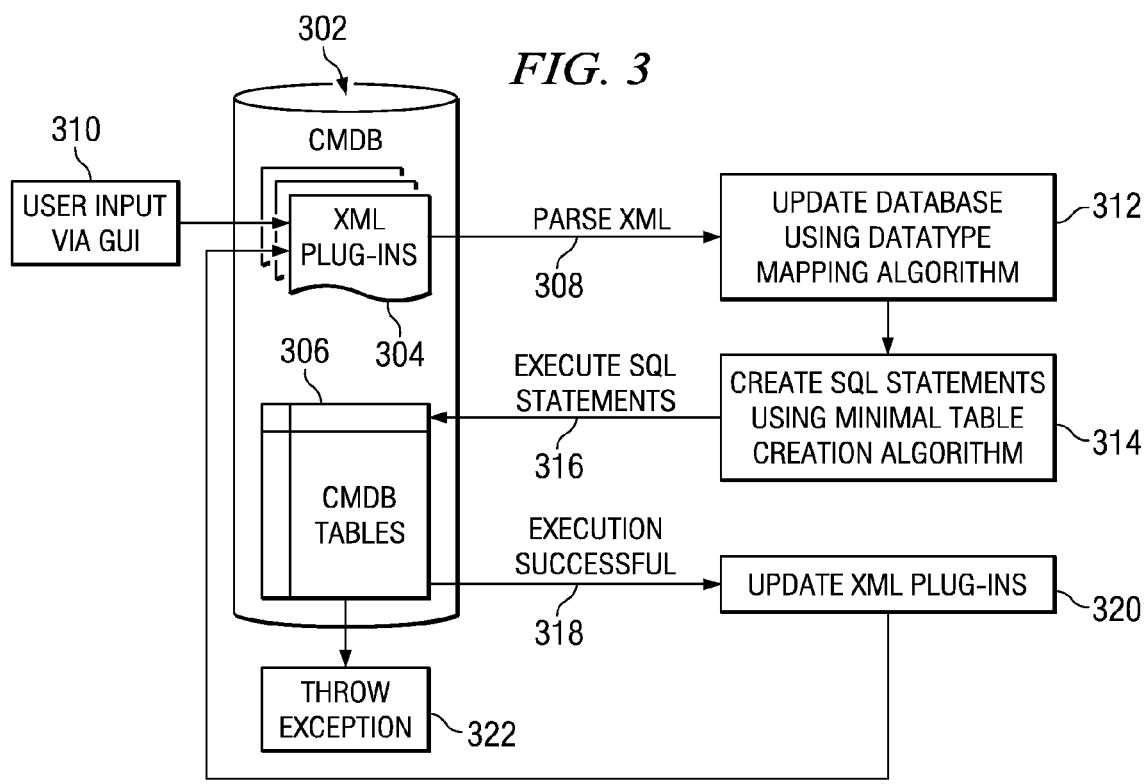
FIG. 3 illustrates an overview of an extensible CMDB environment used to implement the illustrative embodiments is shown.

Turning now to FIG. 3, an overview of an extensible CMDB environment used to implement the illustrative embodiments is shown. CMDB 302 internally stores a representation of other software and hardware systems for the enterprise, among other information. This information may be pulled or pushed into the database from outside sources, such as a configuration management application. In this illustrative example, CMDB 302 includes XML plugins 304 and CMDB tables 306. Each XML plugin is an XML schema that may contain interface, class, attribute, relationship, and managed element definitions. XML plugins 304 are structured so as to provide clarity of division between core CMDB XML schema and extension schemas. For instance, XML plugins 304 in CMDB 302 may include a core CMDB XML schema, an internal extension XML schema, and a customer extension XML schema. An internal extension XML schema plugin comprises extensions to the CMDB database that are created internal to a business or organization. A customer extension XML schema plugin comprises extensions to the CMDB database that are created by customers outside of the business or organization.

A user may request to extend the CMDB providing input to the database via a graphical user interface such as GUI 310 or by creating or updating an XML plugin file in the database. When the user input is received, CMDB 302 parses 308 XML plugins 304 containing the CMDB schema information. Data type mapping algorithm 312 is used to determine the most optimal database data type for the database used. Data type mapping algorithm 312 obtains the database data type information based on the input of the generic type and size provided by the user.

Consider the example of a user extending a DB2™ database. Table 1 shows the mapping rules for determining the optimal database data type for a DB2 database.

| GENERIC DATA TYPE | SIZE | DATABASE DATA TYPE (DB2) |
|---|---|---|
| Boolean | 1 | SMALLINT |
| String | 1-32 | CHARACTER |
| String | 33-250 | VARCHAR |
| String | 251-32,000 | LONG VARCHAR |
| String | >32,000 | CLOB (non-indexable) |
| Short | 1-4 | SMALLINT |
| Int | 1-4 | SMALLINT |
| Int | 5-10 | INTEGER | INT |
| Long | 11-37 | BIGINT |
| Double | 1-31 | DOUBLE |
| Float | 1-31 | FLOAT |
| Enumerated | N/A | SMALLINT |
| Datetime | N/A | TIMESTAMP |

In Table 1, the Boolean generic data type input by the user may be stored as a SMALLINT (small integer) data type in the database as either 0 for true or 1 for false. CHARACTER data type is typically used when the data is known to be a fixed length. Strings of a size less than 32 bytes are allowed when using the CHARACTER data type in order avoid wasting database space. If the user inputs a String with a size between 33 bytes and 250 bytes, the VARCHAR (Variable Character Field) data type may be used. The VARCHAR data type limited to 250 bytes even though the storage space used is based on the actual size of the data (which may be smaller than the user-specified size). Although using the actual size of the data avoids a waste of memory, it may be problematic with regard to page size and index size calculation. For example, if Strings sized at 3000 bytes are using VARCHAR and there are several columns in the table using the same specification, the maximum page size allowed may be quickly exceeded, even though the actual space is not being used. In addition, since the limit for index size is 256, the size limit for VARCHAR is between 33 and 250 bytes. Strings larger in size will use either LONG VARCHAR (for 251-32,000 bytes) or CLOB (Character Large Object) (>32,000 bytes). LONG VARCHAR is used because there are differences in the way the data is stored between LONG VARCHAR and CLOB. With regards to indexing, LONG VARCHAR can be more complicated than indexing a regular VARCHAR or CHARACTER, but a CLOB cannot be indexed at all. Assuming the user will not need to index information stored as LONG VARCHAR or CLOB, search performance will not be a factor.

Once the database data types are determined using the database mapping algorithm, the minimal table creation algorithm 314 is used to achieve a minimal number of tables for the extension to the CMDB. Minimal table creation algorithm 314 obtains a minimal number of tables by creating SQL statements that include specific database information, such as database datatype, size, column or table name, page size, indexable, and the like. The SQL statements reduce the number of table joins necessary to obtain data from the database. The SQL statements may create a new CMDB table either to hold new attributes for an existing class type or to hold new class type data with the new attributes.

To create a minimum number of tables for an extension to the CMDB, the new attributes are first ordered by size from smallest to largest. The maximum number of attributes allowed to be placed in one table is determined by adding the sizes of the attributes from smallest to largest until the page size limit is met. Attributes that fall within the page size limit are placed into a first table. Those attributes that fall outside of the page size limit are placed into a second table, and so on. For example, Table 2 below comprises a list of attributes and sizes and the DB2 data type (in bytes).

TABLE 2

| ATTRIBUTE | SIZE | DB2 DATATYPE | CALCULATED SIZE |
|---|---|---|---|
| Name | 50 | VARCHAR | 52 |
| Phone number | 50 | VARCHAR | 52 |
| Role | 250 | VARCHAR | 252 |
| Description | 2000 | LONG VARCHAR | 22 |
| Profile | 3000 | LONG VARCHAR | 22 |

Note that the attributes are ordered in size from smallest to largest. If the page size is equal to 400 bytes, only the first three attributes (Name, Phone Number, and Role) may be placed into the first table, since the addition of the Description attribute (2000 bytes) would put the table over the page size limit of 400 bytes. The attributes contained in the first table is shown below in Table 3.

TABLE 3

Name
Phone number
Role

The attributes falling outside the page limit (Description and Profile) are placed into a second table, as shown below in Table 4. The Description and Profile attributes may both be placed in the second table, since their combined calculated size falls within the page size limit of 400 bytes.

TABLE 4

Description
Profile

By ordering the attributes in size from smallest to largest, the smaller sized attributes will likely be in the same table. The minimal table creation algorithm will decrease the amount of time it takes to perform a database search, since the limit on indexable columns is roughly 250 bytes and the smaller sized attributes will likely be placed in the same table.

When the SQL statements generated by the minimal table creation algorithm are executed 316, if the statements are successfully completed 318, the particular XML plugins 320 specified in the SQL statement are updated. For example, the XML plugins may be updated with database information specified in the SQL statement, such as column name, database data type, table name, etc. If the statements are not successfully completed, an exception is thrown 322. One example of when an exception may be thrown is when a new class name provided by the user exceeds the maximum number of characters supported by the particular database.

Figure 4:
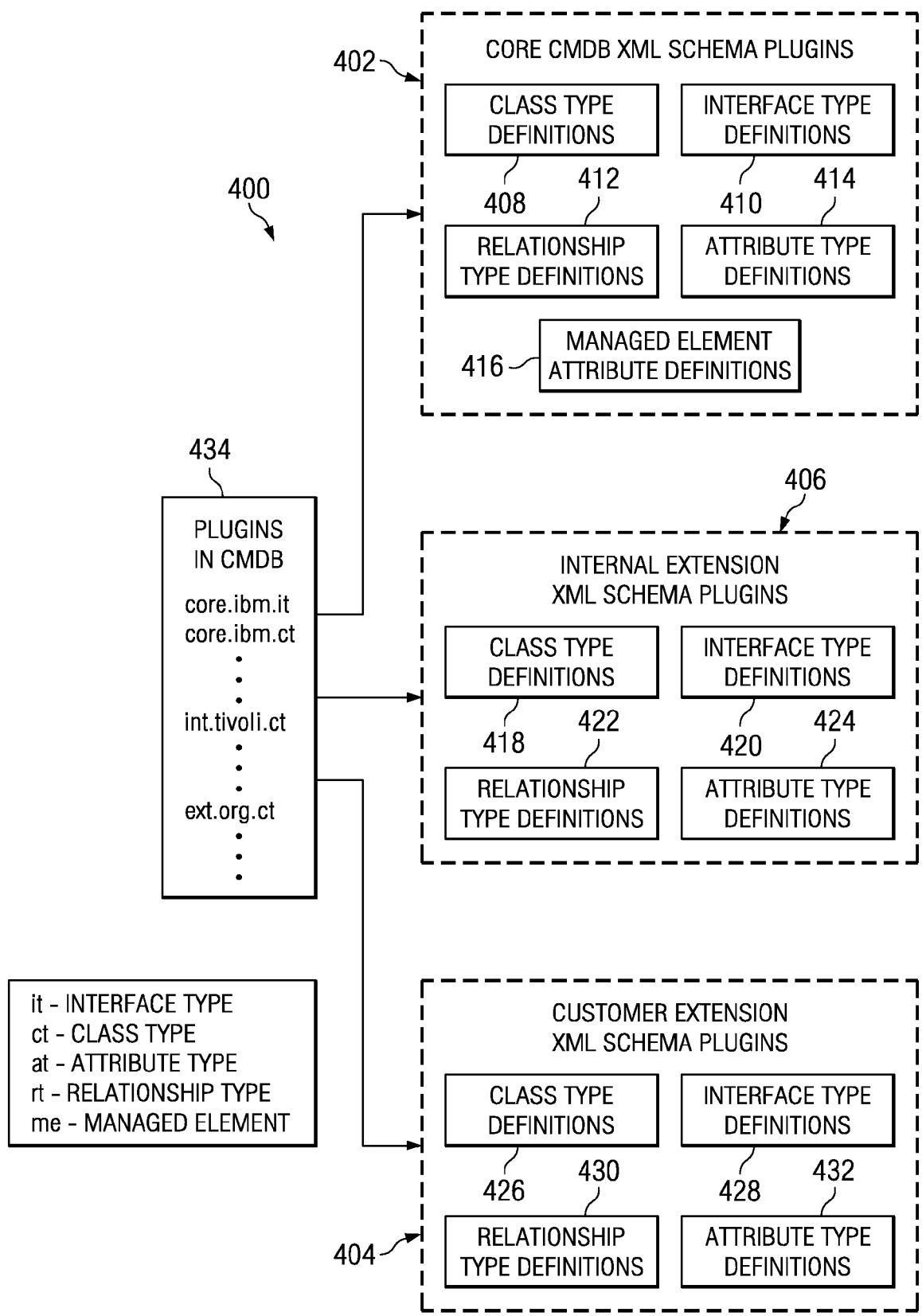
FIG. 4 is a block diagram of an extensible markup language (XML) plugin structure.

FIG. 4 is a block diagram of an extensible markup language (XML) plugin structure. XML plugin structure 400 comprises exemplary core CMDB, internal, and external extension XML schema plugins, such as plugins 304 in FIG. 3. A specific structure to the XML plugins is required in order to provide clarity of division between the core CMDB XML schema 402 and the extension (customer 404 and internal 406) XML schemas. The structure specifies that all new interfaces, classes, attributes, and relationships will be preserved in separate XML plugins. For instance, core CMDB XML schema plugins 402 comprises class type plugin 408, interface type plugin 410, relationship type plugin 412, attribute type plugin 414, and managed element attribute plugin 416. Likewise, internal extension XML schema plugins 406 comprise class type plugin 418, interface type plugin 420, relationship type plugin 422, and attribute type plugin 424. A customer may extend core CMDB XML schema 402 and internal extension XML schema 406 via customer extension XML schema plugins 404, including class type plugin 426, interface type plugin 428, relationship type plugin 430, and attribute type plugin 432. All of the plugins are linked by a common XML file, such as XML file 434. XML file 434 represents the schema of the CMDB and allows for easy updates and additions to the database. For each class type, interface type, etc., XML file 434 specifies the associated schema plugin (e.g., core, int, ext) and organization (e.g., IBM, Tivoli, org, etc.). XML file 434 may be stored in the CMDB.

The same divisions between core CMDB XML schema 402 and the extension (customer 404 and internal 406) XML schemas are propagated to the database. This method of separating the core CMDB, internal, and external schemas provides many benefits, including allowing the encapsulation of existing CMDB schemas apart from customer defined classes and attributes. The number of problems that may occur due to updates to the existing schema with each new release may also be decreased. In addition, any changes made to an existing schema by an external user may be persisted to the database.

When a new class type is created as an extension to the core CMDB schema, a new table will be created in the database to hold the new class type. If the user does not specify a table name for a class type, the class type name may be used by default. If the class name exceeds the maximum number of characters supported by the database, an exception may be thrown to the user to denote the limitation. Changes made to the database that caused the error are rolled back. To avoid table name conflicts with future releases, each table name may be prepended with an identifier (e.g., EXT_) to denote that the extension class type was created externally. All internal teams creating new class types should be aware not to use the identifier prefix for their class types and table names. The table name will also be updated in the common XML file after changes to the database have been successfully completed.

When a new attribute is created as an extension to the core CMDB schema, the new attribute may be handled in different ways. For new attributes created internally, columns may be added to the existing class type table in the database. For new attributes created externally, columns may be added to a separate table extending the existing class type table in the database. For new attributes extending externally created class types, columns may be added to the existing tables for the class types added by the customer.

If the user does not specify a column name for an attribute type, the attribute type name will be used by default. If the attribute type name exceeds the maximum number of characters supported by the database, an exception may be thrown to the user to denote the limitation. Changes made to the database that caused the error are rolled back. To avoid column name conflicts with future releases, each column name may be prepended with an identifier (e.g., EXT_) to denote the extension attribute type was created externally. Thus, internal development teams creating new attribute types should avoid using the identifier prefix for their attribute types and column names. The column name may be updated in the common XML file after changes to the database have been successfully completed.

If a user attempts to create a duplicate relationship type, the user will be notified and the relationship type will not be created until the relationship type name has changed. Both class types specified in the relationship type rule must exist in order for the rule to be created, otherwise the user will be notified in the event of an error. Thus, class type objects will be created first in order to check if the relationship type can be created. In this manner, prior to adding the relationship rules to the database, a globally unique identifier (GUID), which is a unique ID associated with every instance of a class object in the database, will be retrieved for each class type object involved.

Each XML plugin follows a certain format so the XML parser may identify how to store the data and create new class type tables, attribute columns, and interface and relationship types. Table 5 details the purpose of each tag and valid attributes for each tag. Some tags and attributes are optional to accommodate additional flexibility in configuration of the tables. The structure of the XML plugin attempts to mimic the existing CMDB table architecture.

TABLE 5

| TAG | ATTRIBUTES | DESCRIPTION |
| --- | --- | --- |
| classtype | | Definition of a class type which is a managed element that stands alone or implements an interface type. The default is to sub-class Managed Element for the LA release. |
| | name | Name of the class type |
| | schemaname | Name of schema in which the table will reside |
| | tablename | (optional) Table name in database, if not set, default is to take the class type name and throw and exception if longer than db table name character limit (Refer to section 4.2.2) |
| | namespace | Name of namespace (i.e. ibm-cdm:) May not be necessary if all classes have the same name space |
| | description | (optional) Description of the class type |
| class | | Pointer to class definition in corresponding class extension file |
| | name | Name of class that matches name in class extension file |
| attributetype | | Definition for an attribute |
| | name | Name of attribute |
| | columnname | (optional) Column name in database, if not set, default is to take the attribute name and throw an exception if longer than db column name character limit (Refer to section 4.2.2) |
| | description | (optional) Description of the attribute type |
| | type | CMDB data type of attribute (Refer to section 4.2.3) |
| | dbtype | (optional) Database data type for attribute (Refer to section 4.2.3) |
| | unittext | (optional) Name of units using if numerical data (i.e. Seconds) |
| | size | Character size of space required for data stored for this attribute |
| | index | (optional) Set yes to declare this column is to be indexed, and no if not to be indexed, default setting is no |
| | isnullable | Set to yes if column is to be nullable, and no if not nullable, default setting is nullable |
| attribute | | Pointer to attribute definition in corresponding attribute extension file |
| | name | Name of attribute that matches name in attribute extension file |
| interfacetype | | Definition for an interface type |
| | name | Name of interface type |
| | description | (optional) Description of interface type |
| | parent | (optional) If interface type has a parent interface type, put name here, otherwise will default to itself |
| interface | | Pointer to interface definition in the corresponding interface extension file |
| | name | Name of interface that matches name in interface extension file |
| classgroup | | If a class contains multiple classes, the user will need to specify which class should be included in the particular class group. (only used by cmdb core team) |
| | name | Name of top level class (only used by cmdb core team) |
| classmember | | Members of the class group (only used by cmdb core team) |
| | name | Name of member class (only used by cmdb core team) |
| indexgroup | | Used to create multiple attribute indexing |
| | name | Class (table) which contains the attributes to be indexed |
| indexattrmember | | Attributes (columns) to be included in the index group |
| | name | Name of attribute to include in group index |
| relationshiptype | | Definition for a relationship type |
| | name | Name of relationship type |
| | description | (optional) Description of relationship type |
| relationshiprule | | Define valid rules for relationship type |
| | source | Name of source class type |
| | target | Name of target class type |
| relationship | | Pointer to relationship definition in the corresponding relationship file |
| | name | Name of relationship that matches name in relationship file |

Index names may be created by the backend code for easier management of index creation and deletion. Indexes may be created on one attribute type (column) or multiple attributes (columns) in the same table. To create an index on one column, "index" is added into the attributetype tag. To create a multi-attribute index, the backend code may define an index-group and list the attribute names contained in one class type (table). Checks may be put into place to make sure the size of the attribute being indexed falls into the maximum allowed size, and does not exceed the limitations of the database.

A number of naming rules and error handing situations are used to avoid errors when executing SQL statements for table creation, alteration, or insertion of data to update CMDB definitions. In one embodiment, all database size limitations accommodate IBM DB2 for OS/390 and internal extensions to the CMDB schema may be performed by a CMDB development team. For example, Table 6 shows exemplary size limitations on different database types.

TABLE 6

| FEATURE | DB2 8.1 (OS/390) | DB 8.1 | SQL SERVER | ORACLE |
|---|---|---|---|---|
| table name size | 128 B | 128 B | 128 B | 30 B |
| column name size | 30 B (maybe 18) | 30 B | 128 B | 30 B |
| index name size | 128 B | 128 B | 128 B | 30 B |
| index length | 256 B | 1024 B | 900 B | 315 B |
| max # of columns per index | 16 | 16 | 16 | 32 |

Figure 5:
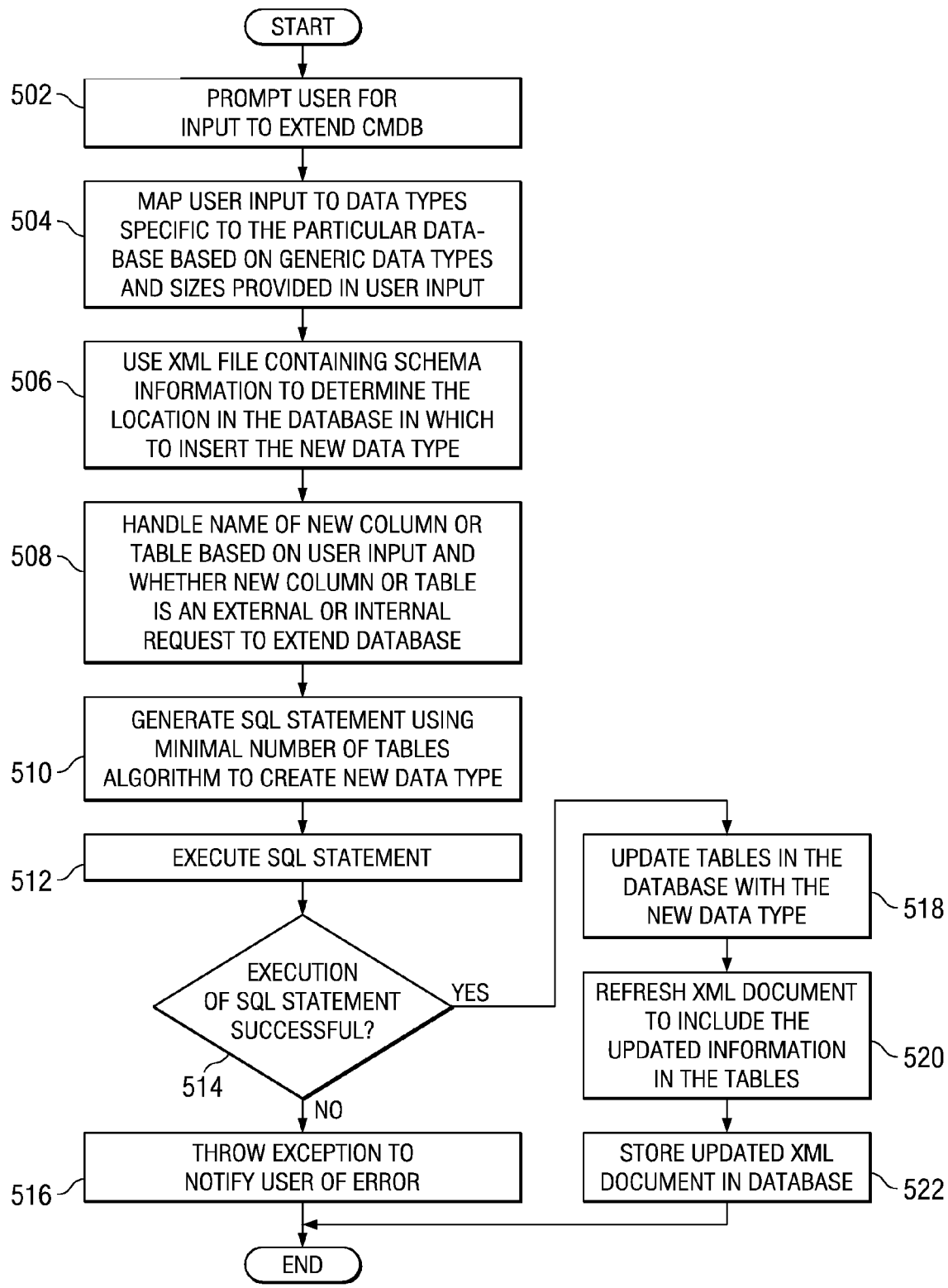
FIG. 5 is a flowchart of a process for allowing users to produce efficient, extended CMDBs.

FIG. 5 is a flowchart of a process for allowing users to produce efficient, extended CMDBs. The process begins with prompting the user for input to extend the CMDB (step 502). To facilitate prompting the user for information, a GUI, such as GUI 310 in FIG. 3, may be provided to the user to receive the user input, or alternatively the user may create or update an existing XML plugin file. The user input may comprise generic data types and size limitations for the data types to be added to the database. For example, the user input may typically comprise one or more attributes (columns) and the size of those attributes. The user input is then mapped to database data types specific to the particular database based on the generic data types and sizes provided in the user input (step 504). The mapping may be performed using the data type mapping algorithm 312 described in FIG. 3.

A common XML file containing schema information for the database is then used to determine the location in the database in which to insert the database data type (step 506). For example, if the user input comprises a new attribute, a new column may be inserted into a location within an existing table or within a newly-created table, depending upon whether the new attributes are created internally or externally. If the user input comprises a new class type, a new table may be created in the database for the new class type. An example of an XML file containing the schema information that may be used to determine locations for inserting the data types in the database is common XML file 434 in FIG. 4. The name of the new column or table is handled based on the user input and whether the new column or table is an external customer or internal request to extend the database (step 508). For instance, if a new column is based on a customer extension to a table, the column name may be prepended with an "EXT_" identifier to denote the extension attribute type was created externally. Internally-created attribute types will not have the same prepended identifier as the customer-created attribute types in order to distinguish between attributes created externally and internally.

An SQL statement may then be generated based on steps 502 through 508 to create the new data type (step 510). The SQL statement may be generated using minimal table creation algorithm 314 as described in FIG. 3. The SQL statement is then executed (step 512). A determination is made as to whether execution of the SQL statement is successful (step 514). If an error occurs upon insertion of the new data type, an exception is thrown to notify the user of the error (step 516), and the process terminates thereafter. Changes made to the database that caused the error are rolled back. Turning back to step 514, if the execution of the SQL statement is successful, the tables in the database are updated with the new data type (step 518). The XML document is then refreshed to include the updated information in the tables (step 520) and stored in the database (step 522).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for extending a configuration management database, the computer implemented method comprising:

receiving input from a user to extend the configuration management database, wherein the input includes a generic data type;

mapping the generic data type to a database data type of the configuration management database, wherein mapping the generic data type is performed using a data mapping algorithm which obtains the database data type for the configuration management database based on the generic data type and size provided in the input;

generating an SQL statement to create the database data type in the configuration management database, wherein generating an SQL statement is performed using a minimal table creation algorithm, wherein the minimal table creation algorithm comprises: ordering attributes associated with the database data type by size from smallest to largest; adding sizes of the attributes from smallest to largest until a page limit size is met; placing attributes within the page size limit into a first table; and placing attributes falling outside the page size limit into a second table; and responsive to a successful execution of the SQL statement, updating tables in the configuration management database with the database data type to reduce a number of tables created for the database data type, wherein the configuration management database comprises core configuration management database extensible markup language schema plugins, internal extension extensible markup language schema plugins, and customer extension extensible markup language schema plugins, wherein the plugins are linked by a common extensible markup language file, wherein the common extensible markup language file comprises schema information for the configuration management database; and responsive to updating tables in the configuration management database, updating the common extensible markup language file to include the database data type.

2. The computer implemented method of claim 1, further comprising:

responsive to an unsuccessful execution of the SQL statement, throwing an exception to notify the user of an error.

3. The computer implemented method of claim 1, wherein generating the SQL statement further comprises:

determining a location in the configuration management database in which to insert the database data type, wherein the location is one of a new column or a new table in the configuration management database; and assigning a name to the new column or table, wherein the name is based on the input and whether the new column or table is an external or internal request to extend the configuration management database.

4. The computer implemented method of claim 1, wherein the input includes a generic data type and size.

5. A data processing system for extending a configuration management database, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to receive input from a user to extend the configuration management database, wherein the input includes a generic data type, map the generic data type to a database data type of the configuration management database using a data mapping algorithm which obtains the database data type for the configuration management database based on the generic data type and size provided in the input, generate an SQL statement to create the database data type in the configuration management database, wherein SQL statement is generated using a minimal table creation algorithm, wherein the minimal table creation algorithm comprises: ordering attributes associated with the database data type by size from smallest to largest; adding sizes of the attributes from smallest to largest until a page limit size is met; placing attributes within the page size limit into a first table; and placing attributes falling outside the page size limit into a second table, update tables in the configuration management database with the database data type to reduce a number of tables created for the database data type in response to a successful execution of the SQL statement, wherein the configuration management database comprises core configuration management database extensible markup language schema plugins, internal extension extensible markup language schema plugins, and customer extension extensible markup language schema plugins, wherein the plugins are linked by a common extensible markup language file, wherein the common extensible markup language file comprises schema information for the configuration management database, and update the common extensible markup language file to include the database data type in response to the update of the tables in the configuration management database.

* * * * *